US006622962B1

United States Patent
White

(10) Patent No.: US 6,622,962 B1
(45) Date of Patent: Sep. 23, 2003

(54) FIXED WING AIRCRAFT HAVING POWERED ROTOR VTOL CAPABILITY WITH ROTOR BLADES STOWABLE DURING HORIZONTAL FLIGHT

(76) Inventor: Bruce D. White, 2109 Showers Dr., Mountain View, CA (US) 94040

( * ) Notice: Subject to any disclaimer, the term of this patent is extended or adjusted under 35 U.S.C. 154(b) by 0 days.

(21) Appl. No.: 10/245,876

(22) Filed: Sep. 16, 2002

Related U.S. Application Data

(60) Provisional application No. 60/376,292, filed on Apr. 29, 2002, and provisional application No. 60/381,761, filed on May 20, 2002.

(51) Int. Cl.[7] .............................................. B64C 27/22
(52) U.S. Cl. ..................... 244/7 R; 244/12.3; 244/23 B
(58) Field of Search ........................... 244/7 R, 8, 12.3, 244/23 B

(56) References Cited

U.S. PATENT DOCUMENTS

| | | | |
|---|---|---|---|
| 3,096,041 A | * | 7/1963 | Cheeseman et al. ......... 244/7 R |
| 3,119,577 A | * | 1/1964 | Andrews ..................... 244/7 R |
| 3,149,802 A | | 9/1964 | Wigal |
| 3,163,376 A | * | 12/1964 | Davidson ..................... 244/7 R |
| 3,370,809 A | * | 2/1968 | Leoni .......................... 244/7 R |
| 3,528,630 A | * | 9/1970 | Ferris et al. ................ 244/12.3 |
| 3,762,667 A | * | 10/1973 | Pender ........................ 244/7 A |
| 4,059,247 A | | 11/1977 | Prewitt |
| 4,071,206 A | | 1/1978 | Magill |
| 4,335,537 A | | 6/1982 | Walker |
| 4,434,956 A | | 3/1984 | Gonzales |
| 4,469,294 A | | 9/1984 | Clifton |
| 4,691,877 A | | 9/1987 | Denning |
| 4,711,415 A | | 12/1987 | Binden |
| 4,730,795 A | | 3/1988 | David |
| 4,765,567 A | | 8/1988 | Gutman et al. |
| 4,783,023 A | | 11/1988 | Jupe |
| 4,789,115 A | | 12/1988 | Koutsoupidis |
| 4,913,376 A | | 4/1990 | Black |
| 4,930,724 A | | 6/1990 | Snyder |
| 4,979,698 A | | 12/1990 | Lederman |
| 5,174,523 A | | 12/1992 | Balmford |
| 5,421,538 A | | 6/1995 | Vassa |
| 5,454,530 A | | 10/1995 | Rutherford et al. |
| 5,544,844 A | | 8/1996 | Groen et al. |
| 5,727,754 A | | 3/1998 | Carter, Jr. |
| 5,984,635 A | | 11/1999 | Keller |
| 6,062,508 A | | 5/2000 | Black |
| 6,089,501 A | | 7/2000 | Frost |
| 6,234,422 B1 | | 5/2001 | Bolonkin |
| 6,340,133 B1 | | 1/2002 | Capanna |
| 2003/0006339 A1 | * | 1/2003 | Capanna ..................... 244/7 R |

* cited by examiner

Primary Examiner—J. Woodrow Eldred
(74) Attorney, Agent, or Firm—Michael D. Graham

(57) ABSTRACT

An apparatus that includes a rotor blade assembly capable of generating vertical lift, one or more propulsion units capable of engaging and disengaging from the rotor blade assembly, an encapsulating housing, and where the encapsulating housing is capable of containing the rotor blade assembly.

46 Claims, 13 Drawing Sheets

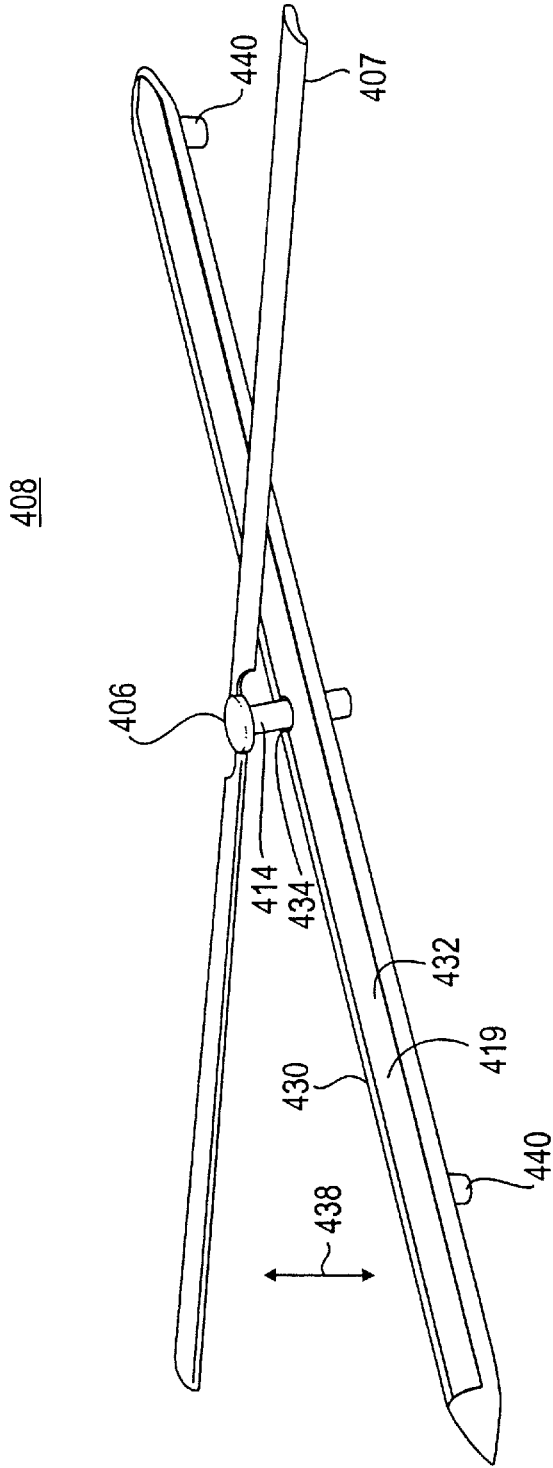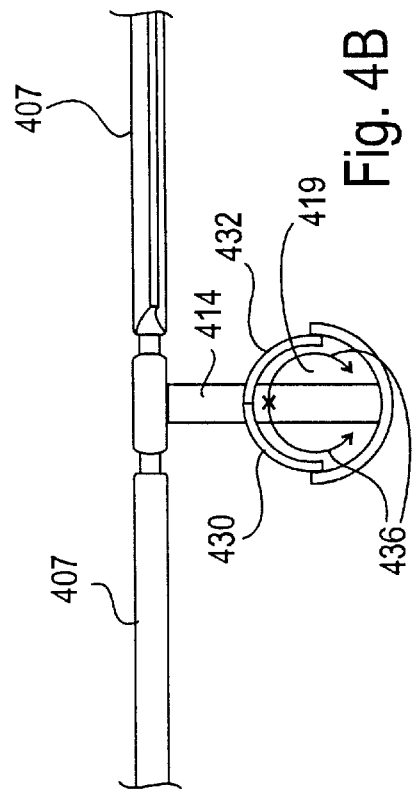
Fig. 4A
Fig. 4B

FIXED WING AIRCRAFT HAVING POWERED ROTOR VTOL CAPABILITY WITH ROTOR BLADES STOWABLE DURING HORIZONTAL FLIGHT

RELATED APPLICATIONS

This application is related to and claims the benefit of U.S. Provisional Application No. 60/376,292 filed on Apr. 29, 2002 titled AIRCRAFT WITH POWERED ROTOR VTOL CAPABILITY and of U.S. Provisional Application No. 60/381,761 filed on May 20, 2002 titled EXTENDING THE AIRCRAFT WITH POWERED ROTOR VTOL CAPABILITY.

FIELD OF INVENTION

This invention relates to the field of aircraft and more specifically, to a fixed-wing aircraft having VTOL capability.

BACKGROUND OF THE INVENTION

Long ground trips through congested freeways to crowded airports having sold-out parking are a fact of life for passengers making use of the current aviation industry at the present time. Add to this the inefficiencies of handling large numbers of passengers and luggage further acts to increase the cost in time, money and the attendant irritation factors.

SUMMARY OF THE INVENTION

An apparatus and method is described that offers an aircraft the high speed/low drag advantages of conventional fixed wing aircraft with the Vertical Takeoff and Landing (VTOL) ability of rotational wing (rotor) aircraft. The apparatus and method can allow an aircraft to achieve both a pure vertical and horizontal flight and with the capability to quickly transition between these two flight regimes.

The apparatus can be propelled in both rotary-wing and fixed-wing modes using a power source such as, for example, a conventional turbofan engine. A rotor such as a two-bladed rotor assembly can be used to generate the required lift for hover, vertical movement, and low-speed forward flight like a helicopter. Once the aircraft is at a sufficient forward velocity, lift from the rotor blade assembly can be removed with lift being provided by the fixed wings, such as, for example, a main wing and a horizontal tail wing. The rotating rotor blade assembly can then be stopped and locked into a position that has the rotor blades aligned along the length of the fuselage.

After the rotor assembly is locked in this longitudinal direction, the rotor blade assembly can be stowed in a housing that encapsulates the rotor blade assembly. The fixed-wings then provide the lift in a conventional fixed-wing flight mode. A reverse sequence of these events could transition the vehicle back to its rotary wing-VTOL mode for descent and landing on small landing areas.

Techniques for transitioning between vertical and horizontal flight requires coordination between the decrease of downward rotor thrust that dominates during the vertical flight regime with the increase in turbofan jet backward thrust used in the horizontal flight regime. Such coordination must occur progressively, incrementally, and smoothly and where the addition of an attitude control system, jet deflection vanes, and jet exhaust nozzles can add to the control of the transitioning flight regimes.

Additional features and advantages of the present invention will be apparent from the accompanying drawings and from the detailed description that follows.

BRIEF DESCRIPTION OF THE DRAWINGS

The present invention is illustrated by way of example, and not by way of limitation, in the figures of the accompanying drawings and in which:

FIG. 4A is an illustration of one embodiment of an external encapsulating housing with dual circular lids.

FIG. 4B is an illustration of one embodiment of a cross-section of the external encapsulating housing with dual circular lids.

DETAILED DESCRIPTION

In the following description, numerous specific details are set forth such as examples of specific materials, components, dimensions, etc. in order to provide a thorough understanding of the present invention. It will be apparent, however, to one skilled in the art that these specific details need not be employed to practice the present invention. In other instances, well-known components or methods have not been described in detail in order to avoid unnecessarily obscuring the present invention.

The material structures of the invention can be embodied in a hybrid aircraft having both a helicopter type rotor blade assembly and a fixed wing. The hybrid aircraft can be capable of both vertical and horizontal flight. At a point in the transition between vertical and horizontal flight, with flight loads transferred to the fixed wing, the rotor blade assembly can be stopped and positioned within a housing (stowed) to reduce aerodynamic drag. As a result, the hybrid aircraft can be capable of Vertical Takeoff and Landing (VTOL) while retaining a low drag coefficient during horizontal flight that is more typical of pure fixed wing aircraft.

Many problems occurring at over-crowded airports can be reduced by utilizing the medium sized, hybrid VTOL (Vertical Take-Off and Landing) aircraft at smaller and more dispersed airports and considering that every helicopter pad could potentially become a node in a world wide network of air transport. As a result, problems for existing airports with in-the-air congestion and aircraft noise affecting citizens living in the surrounding area would also be improved by this dispersing.

For military operations, every open and flat landing area can become a node. A military version of the hybrid VTOL aircraft, such as a single-seat fighter or a transport, can gain the benefits of rapid force projection at long range while providing a reduced cost compared to the other VTOL options.

In addition to operating among the outer node airports, these hybrid VTOL aircraft could also operate to general aviation airports. This would enable a rapid expansion of airline service to areas that are not currently served. Hence, the air transportation system could readily transform to a more distributed system. A rapid, more efficient service would be realized by landing closer to the terminal, thereby minimizing aircraft taxi time, noise and emissions. Thus approach could increase national mobility and accessibility, with minimum environmental impact.

The hybrid VTOL aircraft can be designed for small to medium sized aircraft, that is, to carry approximately 1–100 passengers. The hybrid VTOL aircraft can use the rotor blade assembly for vertical flight, for hover and loiter, for takeoff and landing, and for low speed horizontal flight. The hybrid VTOL aircraft can have at least one set of fixed wings in the fixed-wing design to provide low-drag lift at the higher horizontal flight speeds when the rotor blade assembly is stowed.

Figure 1A:
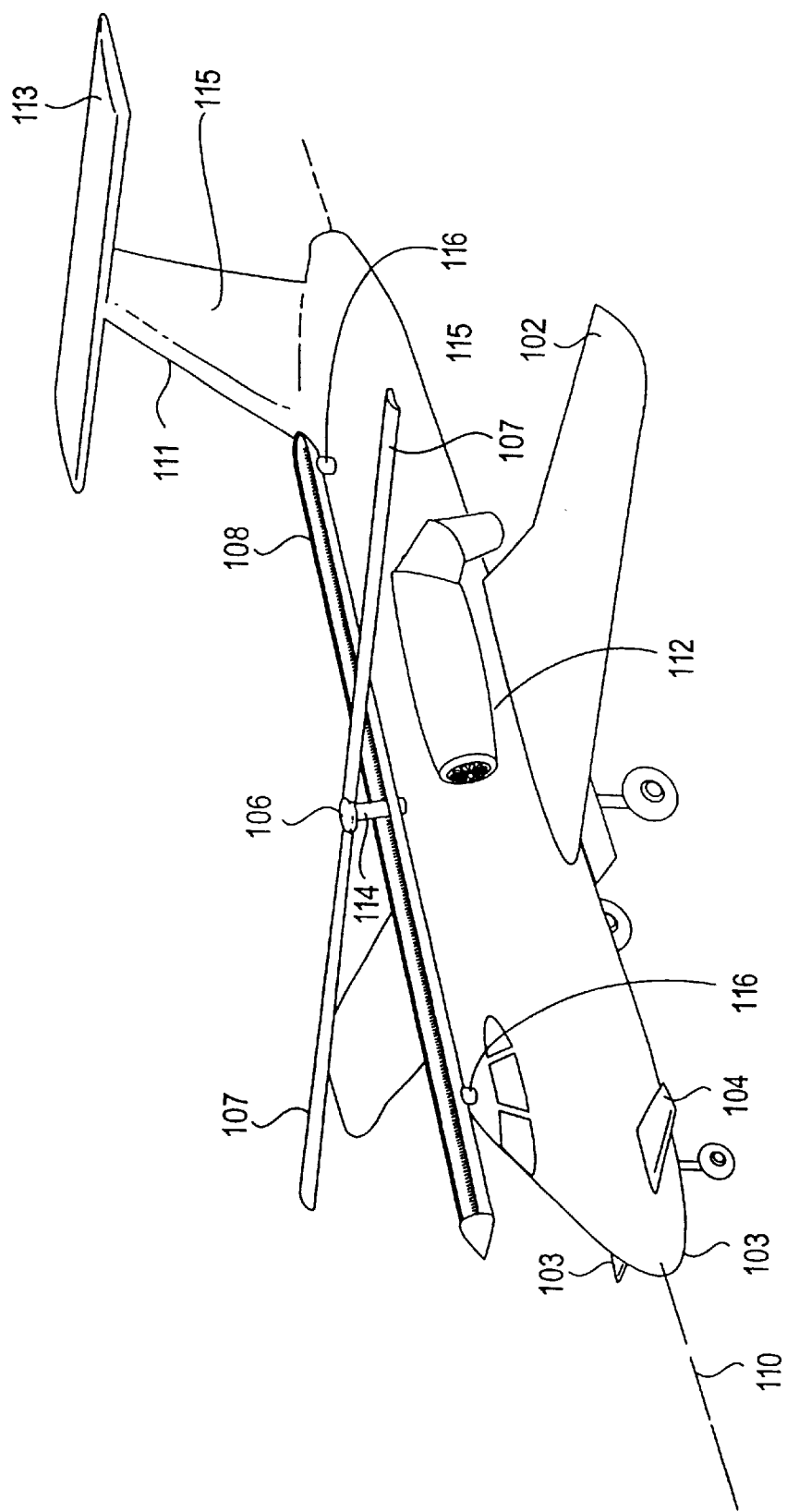
FIG. 1A is an illustration of one embodiment of a hybrid VTOL aircraft in a vertical flight mode.
Figure 1B:
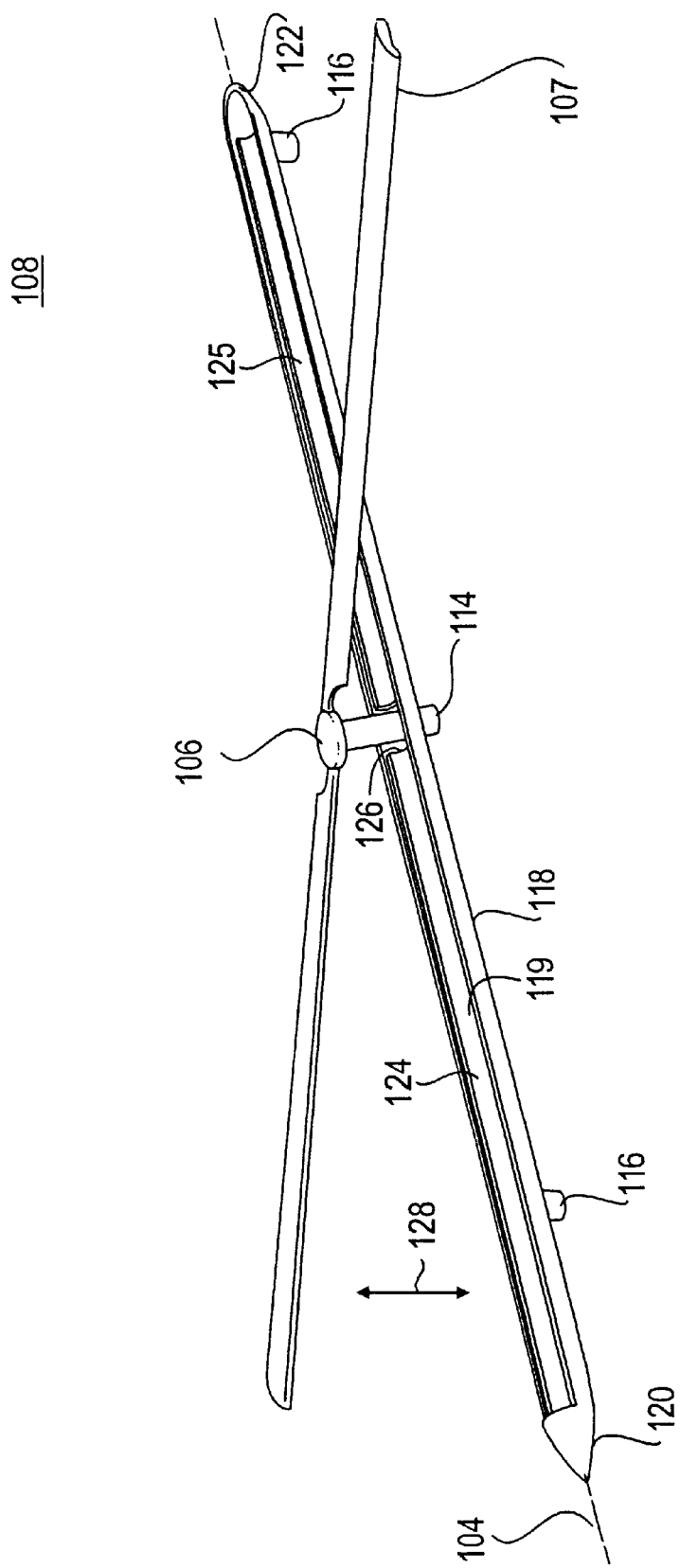
FIG. 1B is an illustration of an encapsulating housing in vertical the flight mode.

FIGS. 1A and 1B are illustrations of one embodiment of a hybrid VTOL aircraft in a vertical takeoff or hover mode. In the one embodiment, the hybrid VTOL aircraft 100 can carry approximately 30–40 passengers. Since the fixed-wing of the hybrid VTOL aircraft provides little or none of the lift at takeoff, the fixed-wing 102 can have a surface area that is reduced from a standard fixed wing aircraft. The reduced fixed wing surface area can provide reduced drag at the higher horizontal flight speeds. A canard wing 103 can be positioned on the fuselage to aid with additional lift and with the flight dynamics. A dual rotor blade assembly 106 can be mounted on top of the fuselage 104. Positioned between the fuselage 104 and the rotor blade assembly 106, an external encapsulating housing (housing) 108 can be disposed along the longitudinal axis 110 of the fuselage 104. The external encapsulating housing 108 can be constructed so as to be strong enough to withstand aerodynamic loads and minimize vibrations during flight. Such strength can be the result of a stiffness of the housing 108, which can be related to the strength of the materials used and the size and shape of the housing 108. Twin turbofan engines 112 can be mounted on opposite sides of the fuselage 104 and close to a rotor hub (includes shaft) 114 that connects the individual rotor blades 107.

As shown in FIG. 1B, the encapsulating housing 108 can be a tube of a length capable of housing the rotor blade assembly 106. The housing 108 can include a base tube 118 having a top-positioned opening 119, an aerodynamically shaped nose cone 120, an aerodynamic shaped tail cone 122, and a circular, such as, for example a semi-cylindrical shaped lid 124. The lid 124 can be capable of rotation around the base tube 118 to open or seal the top opening 119. A slot 126 in the lid 124 can provide clearance around the rotor hub 114 when the lid 124 is rotated within the base tube 118 and the encapsulating housing 108 is "open" (as shown).

The encapsulating housing 108 can be positioned adjacent to the rotor blade assembly 106 and where translating mechanisms 116 such as actuators and/or hydraulic pistons can attach the housing 108 to the fuselage 104. The translating mechanisms 116 can be capable of raising and lowing 128 the encapsulating housing 108, that is moving the encapsulating housing 108 toward the rotor blade assembly 106 or toward the fuselage 104 respectively.

As shown in FIG. 1A, for both rotary and fixed-wing flight modes, the hybrid VTOL aircraft can be powered by one or more conventional turbofan engines 112. The twin turbofan engines 112 can have jet exhaust nozzles 115, which can be capable of deflecting a portion of the engine 112 exhaust downward to produce a vertical thrust vector that can add to the vertical lift force created by the rotating rotor blade assembly 106. In one embodiment, torque created by the rotating rotor blade assembly 106 may be countered by thrust from gas escaping a nozzle 115 positioned in the vertical tail section 111. A portion of the compressed air within the jet engines 112 can be diverted into a system that ports the diverted gas to the anti-torque nozzle 115.

In one embodiment the aircraft can utilize diverter valves that direct the exhaust thrust to the rotor blade tips to exhaust at a jet nozzle and drive the rotor blade assembly 106 to rotation (not shown). Alternatively, in one embodiment, a drive train and transmission can be used as a direct power link to transfer power from the turbofan engines 112 to the rotor blade assembly 106.

In one embodiment, the aircraft can be made of a composite fiber fuselage with aluminum internal structure to form an approximate 30–40 seat pressurized composite cabin. The fuselage 104 can be locally reinforced such that the two composite turbofan engines 112 can be attached to the fuselage 104 close to the rotor hub/shaft 114 to minimize power linkage losses.

Using the rotor blade assembly 106, the hybrid VTOL aircraft 100 can be capable of taking off, landing, and hover like a traditional helicopter. A combination of lift from the rotor blades 106 and the downward vectored jet engine 112 thrust, can provide a mechanism for loiter, i.e. the ability to move around slowly in a small area for long periods of time. With the rotor blade assembly 106 in the stowed position (FIG. 1B), the hybrid VTOL aircraft 100 can be capable of the high-speed flight and wide radius of operation that is typical of a standard fixed-wing jet airplane. It can take approximately 1 min for the hybrid VTOL aircraft 100 to switch modes between pure helicopter and pure fixed-wing airplane, i.e. to transition from vertical to horizontal flight.

Figure 2A:
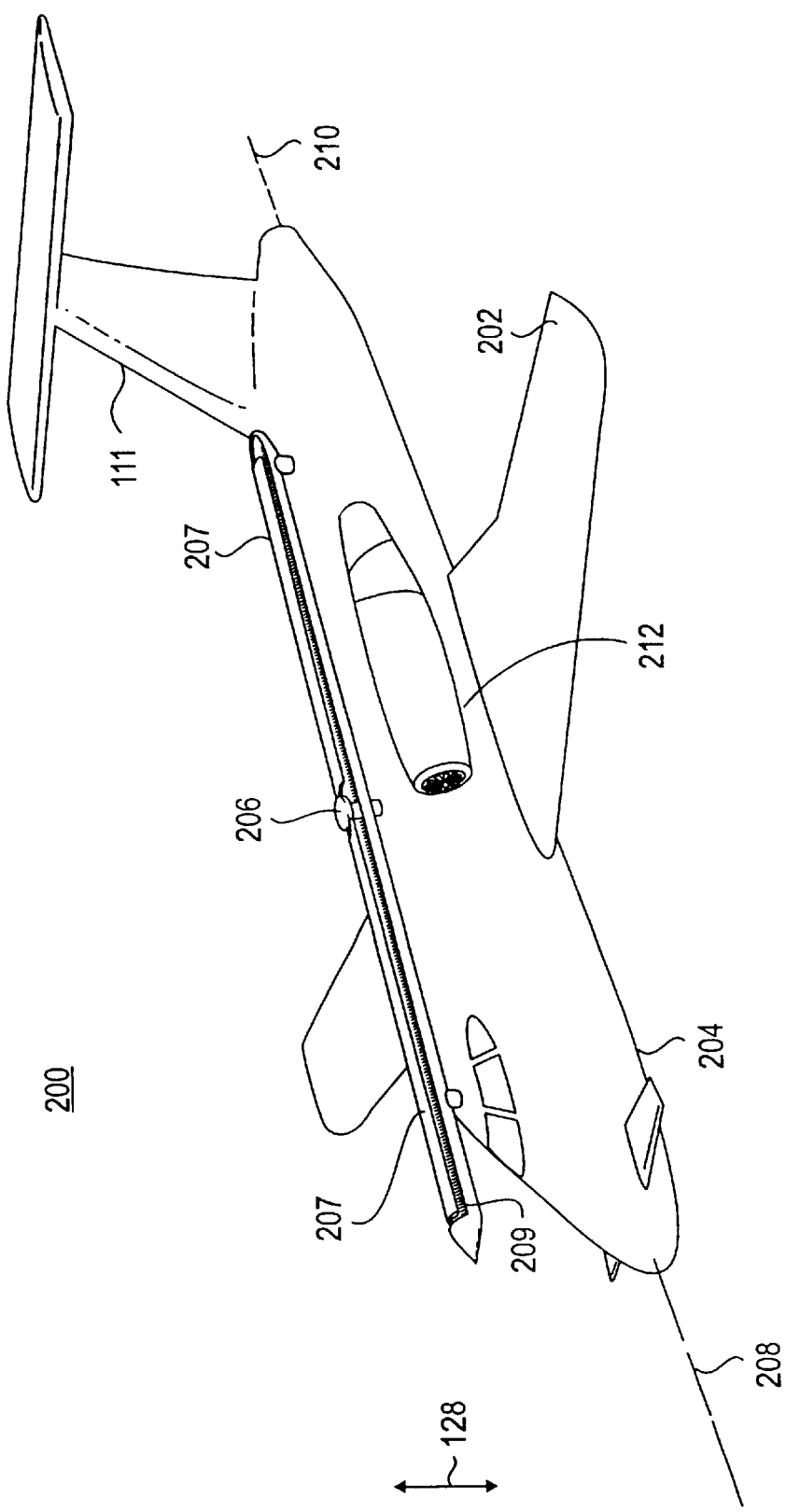
FIG. 2A is an illustration of one embodiment of the hybrid VTOL aircraft with a braked rotor blade assembly.
Figure 2B:
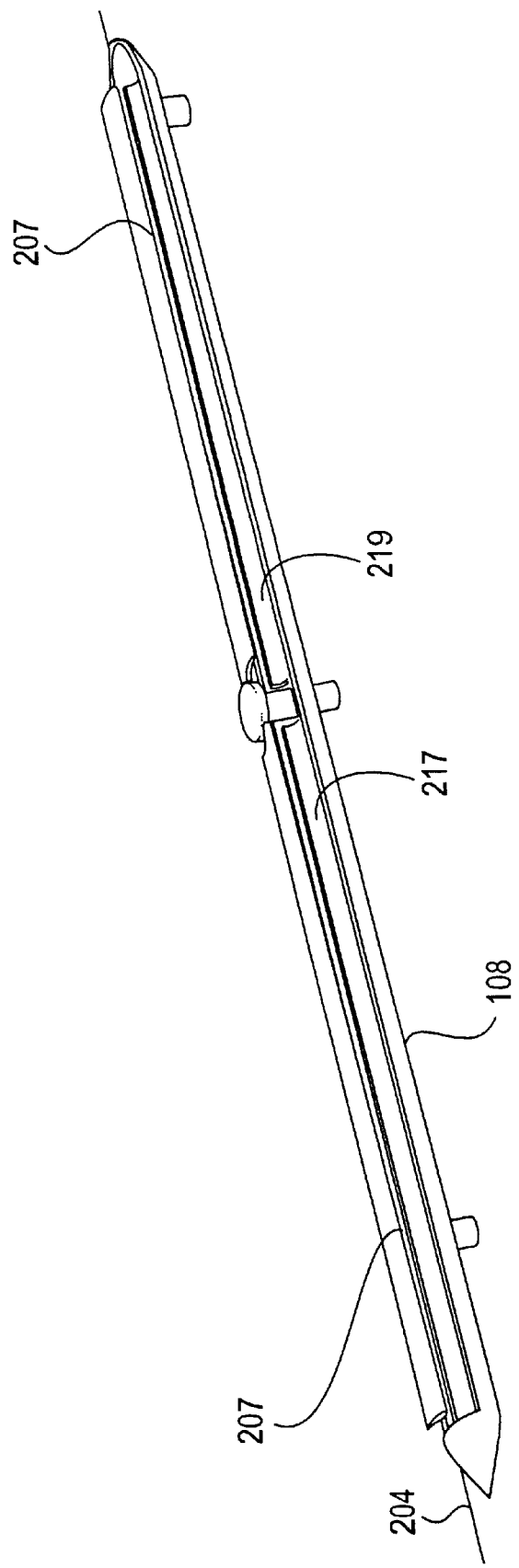
FIG. 2B is an illustration of the encapsulating housing with braked rotor blade assembly.

FIGS. 2A and 2B are illustrations of one embodiment of the hybrid VTOL aircraft in transition to horizontal flight and after having braked the rotor blades. Once the hybrid VTOL aircraft 200 has obtained sufficient horizontal airspeed, lift provided by the fixed-wings 202 can allow the rotor blade assembly 206 to be stowed within the housing 208 and housing lid 209. The rotor blade assembly 206 can first be braked, i.e. stopped, so as to place the individual rotor blades 207 in-line with the axis 210 of the fuselage 204. As a result, the rotor blades 207 can be aligned with the opening 219 in the housing 208 such that later translation by the housing 208 can encapsulate the rotor blade assembly 206.

Figure 3A:
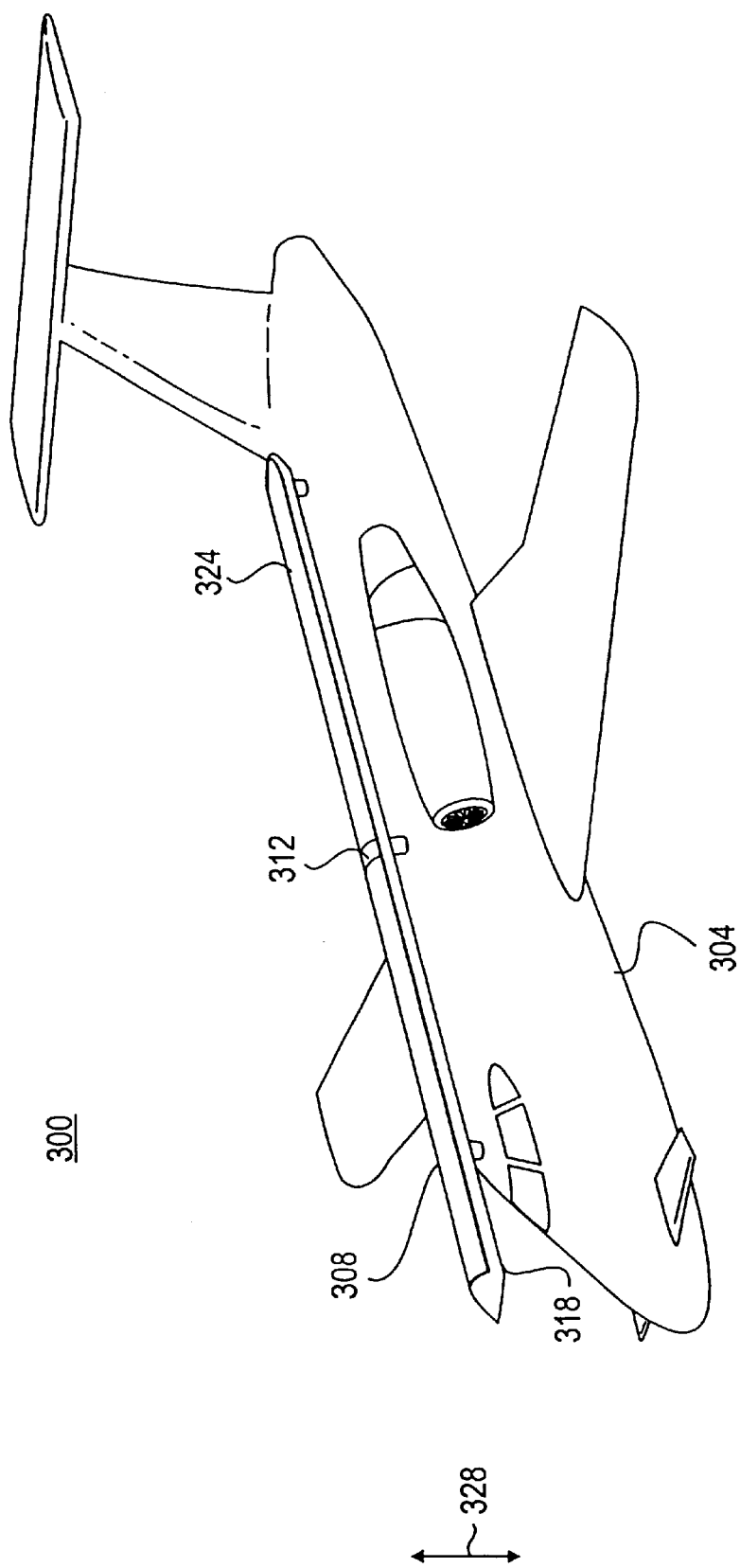
FIG. 3A is an illustration of one embodiment of the hybrid VTOL aircraft with a stowed rotor blade assembly.
Figure 3B:
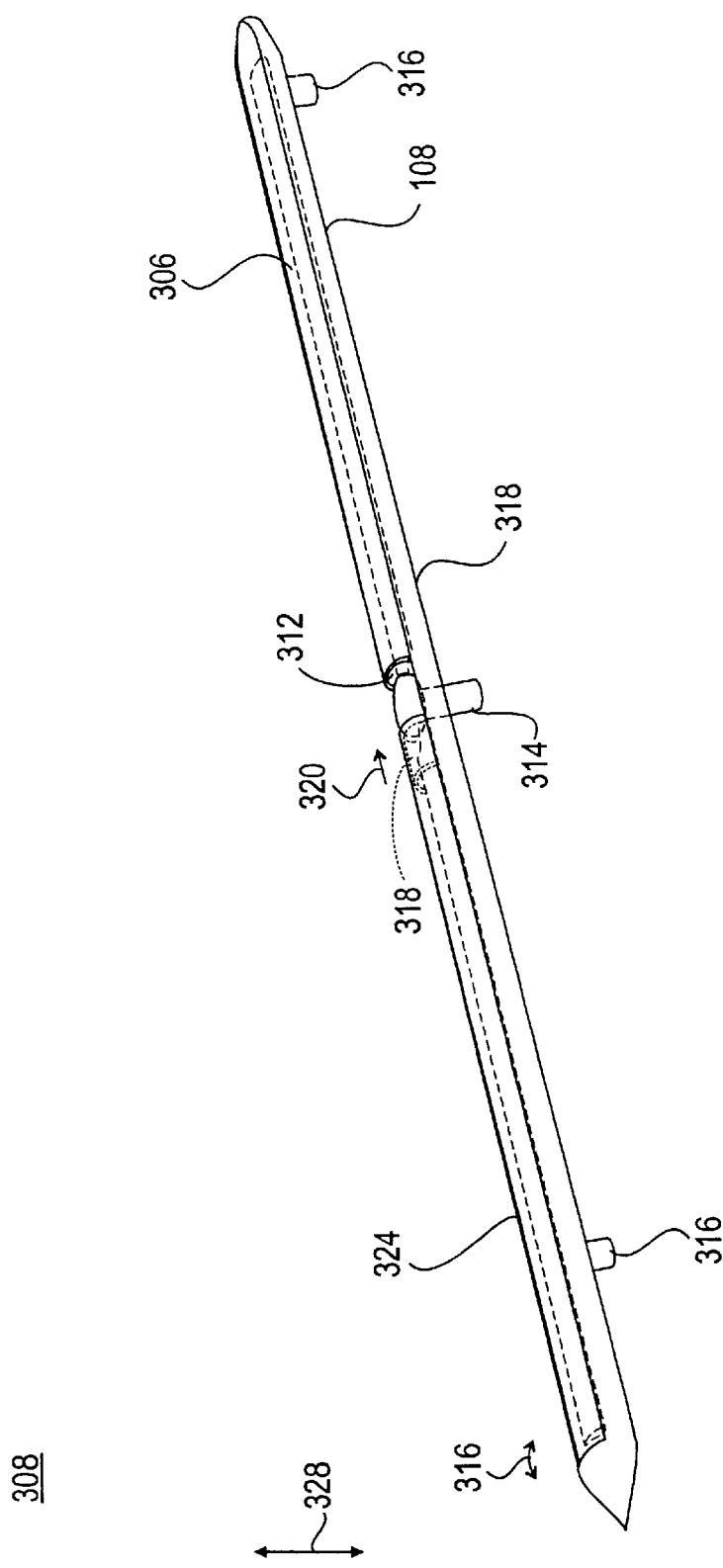
FIG. 3B is an illustration of one embodiment of the encapsulating housing With stowed rotor blade assembly

FIGS. 3A and 3B are illustrations of one embodiment of the hybrid VTOL aircraft in horizontal flight with a stowed rotor blade assembly. The aerodynamically shaped housing 308 is shown moved up 328 by translating mechanisms 316 to place the rotor blade assembly 306 (shown as dashed lines) within the base tube 318. Two semi-cylindrical shaped housing lids 324 are shown rotated approximately between 150–180 degrees to seal the rotor blade assembly 306 within the encapsulating housing 308. A gap 312 can exist between the housing lids 324 to provide clearance around the rotor shaft 314. After the housing lids 324 are rotated 316 to a closed position as shown, a sleeve 318 (shown in dashed lines) can be translated 320 by a device (not shown) such as, for example, a jackscrew, to seal off the gap 312. With the rotor blade assembly 306 encapsulated within the housing 308, horizontal flight speeds can then be increased.

FIGS. 4A and 4B are illustrations of one embodiment of an encapsulating housing having a clamshell lid. The clamshell design can have two curved lids 430 and 432, each with a slot 434 and 436. The curved lids 430 and 432 can be positioned on each side of a top opening 419 of the housing 408. As shown, the two curved lids 430 and 432 can be capable of rotation 436 to close the top opening 419 and where the slots 434 and 436 in each curved lid 430 and 432 can provide clearance for the rotor shaft 414. The housing 408 can be capable of up and down 438 translation to place the stopped rotor blades 407 within or outside of the housing 408 when the rotor blade assembly 406 is being stowed (not shown) or un-stowed (as shown). Translation of the housing 408 can be accomplished by such mechanisms as, for example, actuators and/or hydraulic pistons 440.

During transition from vertical to horizontal flight, and as the lift contribution shifts from the rotor to the fixed wings, the aircraft must (1) make a smooth transition between the two modes in a manner that prevents rotor blade excessive vibration, and (2) reduce the rotor speed to stop. The rotor blade stiffness must be designed accordingly to reduce rotor blade flutter and allow for encapsulation of the rotor blade assembly within the encapsulating housing.

Because the primary fixed-wing is not needed for low speed flight, the fixed-wing can be significantly smaller than fixed-wings on standard aircraft, which can reduce the required cruise power. The resulting speed, range, altitude capability and fuel economy can compensate to some extent for the drag created by the externally positioned housing 108. In one embodiment, a 2-bladed rotor can be a continuous tip-to-tip composite structure comprising the blade and hub in a single unit.

With increased forward velocity, the main wings will provide increased lift. At a point in the transition between vertical and horizontal flight, the rotor will be sufficiently unloaded that power to the rotor blades can removed. As soon as the power linkage is removed from the rotor blade assembly, a braking mechanism (not shown) can slow rotation of the rotor blade assembly. The braking mechanism can stop the rotor blade assembly such that the individual rotor blades are in-line with the length of the fuselage and ready for encapsulation within the housing.

Figure 5B:
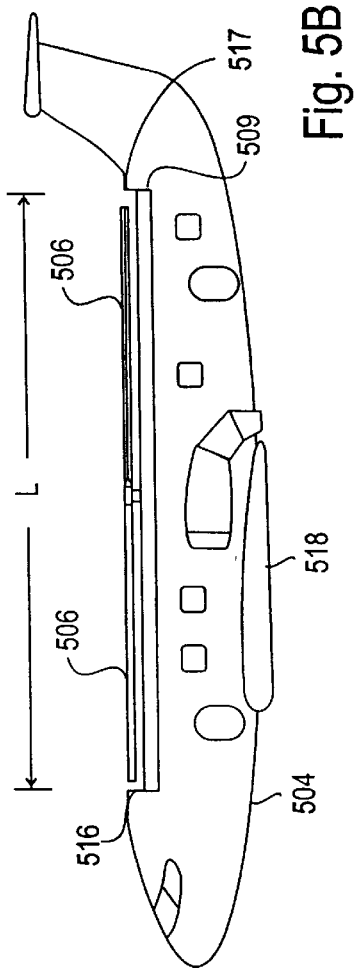
FIG. 5B is an illustration of a hybrid VTOL aircraft with clamshell lids.
Figure 5A:
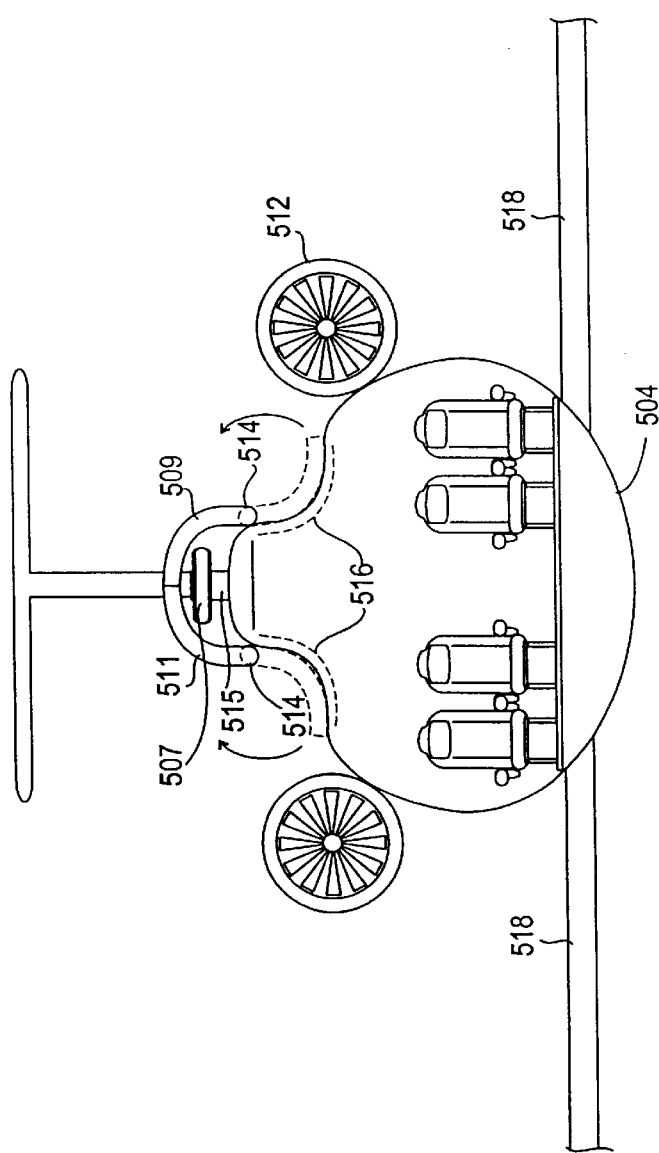
FIG. 5A is an illustration of a cross section of a fuselage and encapsulating housing with clamshell lids.

FIGS. 5A and 5B are illustrations of one embodiment of the hybrid VTOL aircraft. As shown in FIGS. 5A & 5B, encapsulating a rotor blade assembly 506 can be accomplished with a clamshell design that can have two rotatable doors 509 and 511 that can have a length L, which can be a partial length of the fuselage 504. The encapsulation process does not require the rotor blade assembly 506 to translate up and down. Rather, two rotatable doors 509 and 511, when open, can allow the rotor blade assembly 506 to be rotated to provide vertical lift. When closed, the two rotatable doors 509 and 511 can complete the encapsulation of the rotor blade assembly 506 for pure fixed wing flight. The two rotatable doors 509 and 511 can be curved to follow a shape 516 of the fuselage 504 (i.e. mate with). The rotatable doors 509 and 511 can be capable of pivoting 513 at several locations 514 between an open position (doors shown in dashed lines) to a closed position (solid lines) where the closed position can seal the rotor blade assembly 506 within the encapsulating apparatus, i.e. the fuselage 504 and the doors 509 and 511. The turbofan engines 512 can be positioned low enough on the fuselage 504 to provide clearance for the pivoting doors 509 and 511 yet close enough to the rotor hub 515 for convenient mechanical linkage (not shown). A forward end of the fuselage 504 can provide an aerodynamic shield 516 to airflow and along with an aft end 517 of the fuselage 504, can complete the encapsulation of the rotor blade assembly.

Figure 6:
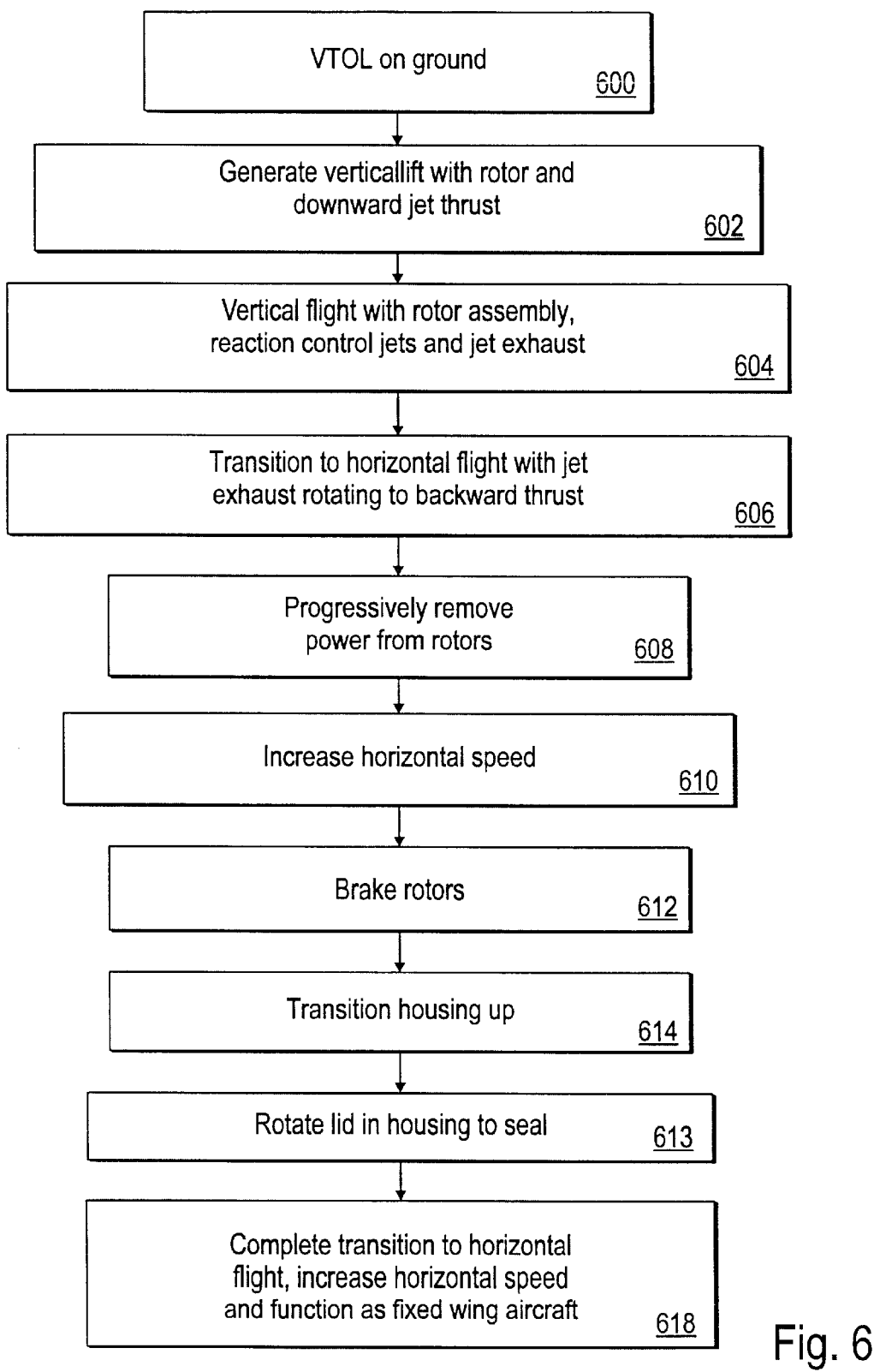
FIG. 6 is a flow diagram of a method of use of a hybrid VTOL aircraft.

FIG. 6 is a flow diagram of one embodiment of a method for encapsulating a rotor blade assembly. A hybrid VTOL aircraft can be grounded with the housing lowered, exposing the rotor blade assembly. Turbofan engines can power the rotor blade assembly along with downward thrusting by rotatable jet engine nozzles and vertical lift can be generated. If multiple stacked rotor blade assemblies are used, a phase angle between the blades of each rotating rotor blade assembly can be maintained. An attitude reaction control system using air pressure bled off from the jet engines can add to the control of the hybrid VTOL aircraft at this point (operation 602). The reaction control system can have at least one small jet positioned at the nose, tail, and wing tips of the aircraft. Sufficient vertical lift can be generated to place the hybrid VTOL aircraft into vertical flight (operation 604). The nozzles can progressively rotate the jet engine thrust backward, and along with the rotor blade assembly, the hybrid VTOL aircraft can transition into horizontal flight (operation 606). The nozzles are providing purely backward thrust from the jet engines and the horizontal velocity is sufficient to have lift provided by the fixed-wings. Power can be progressively removed from the rotor blade assembly until the rotor blade assembly is free from powered rotation (operation 608). Horizontal speed is increased to allow loading on the fixed wings to maintain the hybrid VTOL aircraft in flight (operation 610). The rotor blade assembly is braked to position the individual rotor blades to be inline with the length of the housing (operation 612). Actuators translate the housing up to position the rotor blade assembly within the housing (operation 614). One or more curved lids can be rotated to complete the encapsulation of the rotor blade assembly within the housing (operation 616). The hybrid VTOL aircraft can now operate as a fixed-wing aircraft. The transition to pure fixed-wing horizontal flight is complete. The transition from fixed-wing flight to vertical flight for landing, hover, and/or loiter can be accomplished using a reverse combination of some or all the above-described operations.

Figure 7:
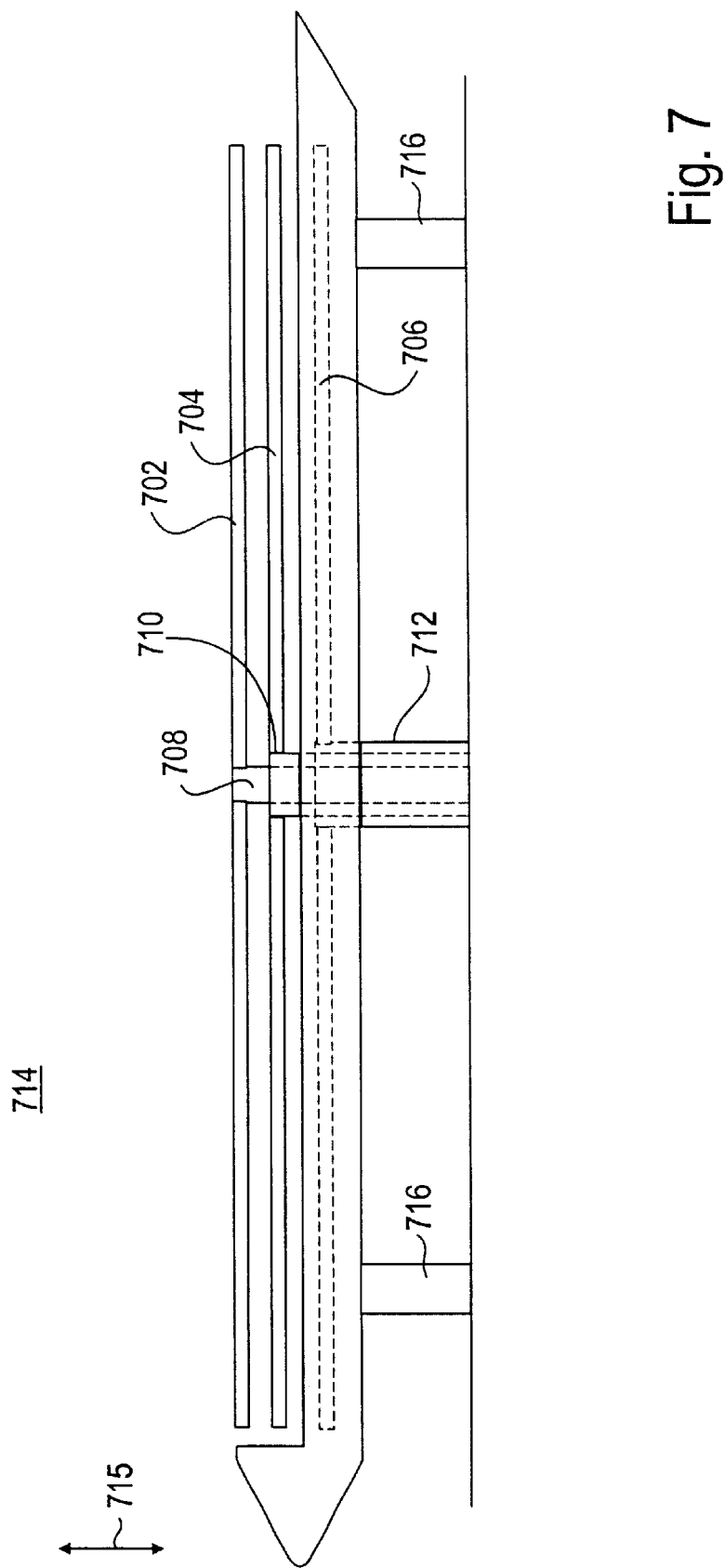
FIG. 7 is an illustration of an external encapsulating housing with three stacked rotor blade assemblies.

FIG. 7 is an illustration of one embodiment where multiple rotor blade pairs can be stacked using coaxial rotor shafts. Multiple rotor blade assemblies 702, 704, and 706 can be stacked on top of each other, with the rotor shafts telescoped 708, 710, and 712 to provide more lift within the same approximate space. As shown, multiple pairs of rotor blade assemblies, shown here are three pairs of rotor blade assemblies 702, 704, and 706, including the respective rotor shafts 708, 710, and 712 stacked within, can be encapsulated in a housing 714. When the rotor blade assemblies 708, 710, and 712 are braked and aligned along the length of the housing 714, the housing 714 can be translated in an up and down direction 715 by, for example, actuators and/or hydraulic pistons 716. During operation of the rotor blade assemblies 702, 704, and 706, the rotor blade assemblies 702, 704, and 706 can have a phase angle, such as, for example, with three pairs of rotor blades, a 60-degree phase angle for each rotor blade relative to a next rotor blade of another rotor blade assembly 702, 704, and 706.

Figure 8A:
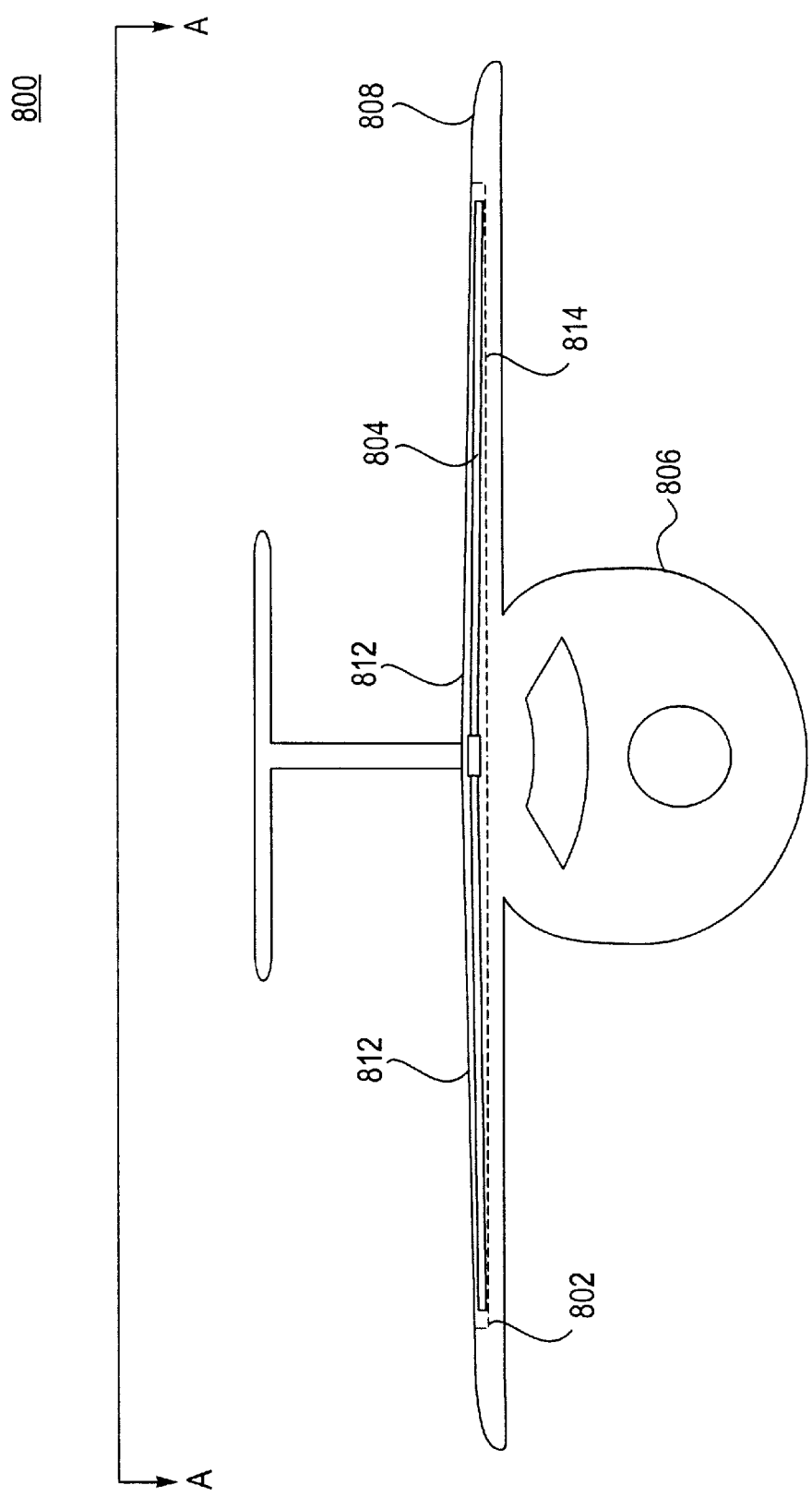
FIG. 8A is an illustration of one embodiment of a hybrid VTOL aircraft with a high-wing and an encapsulating housing integral to the high-wing and the fuselage.
Figure 8B:
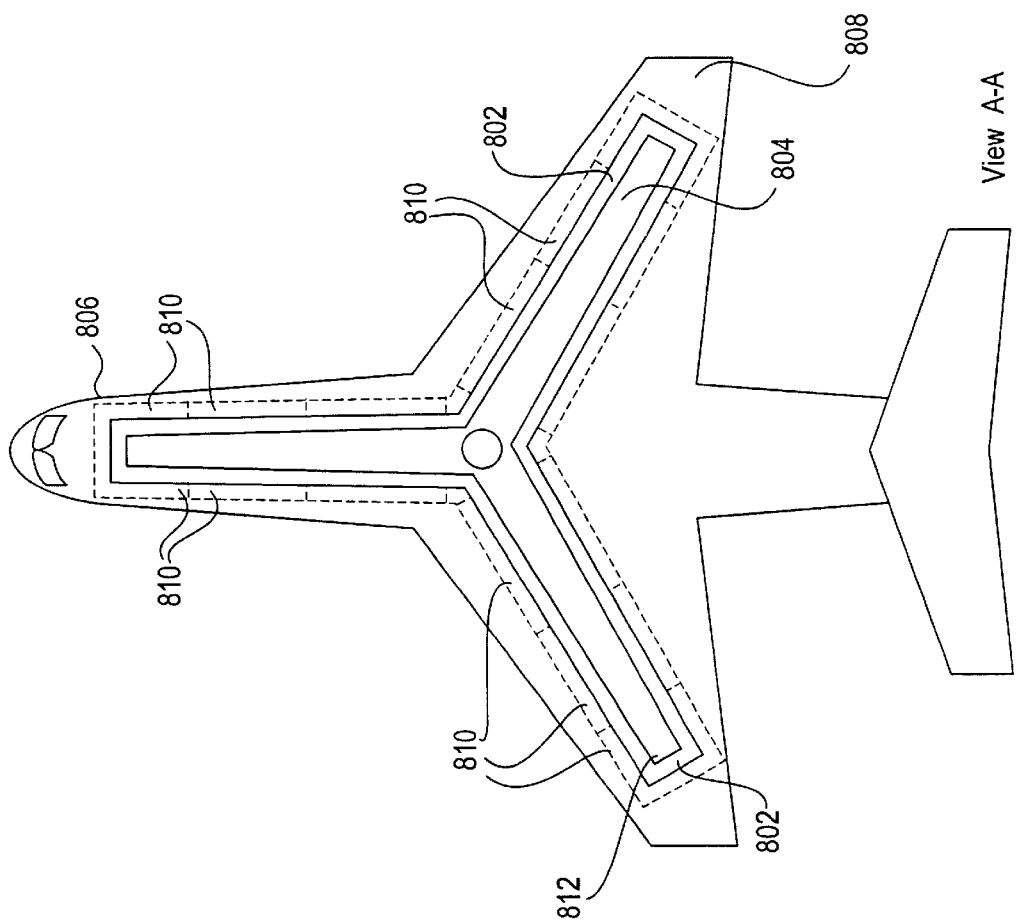
FIG. 8B is an illustration of a top view of the one embodiment of the encapsulating housing integral to the high-wing and fuselage.

FIGS. 8A and 8B are illustrations of one embodiment of an encapsulating housing that is integral to the airframe of a high-wing aircraft. A triple-rotor blade assembly 804 can be capable of recessing into the integral housing 802 where the housing 802 involves both the fuselage 806 and the fixed high-wing 808. The triple-rotor blade assembly 804 can be capable of up and down 810 translation to place the rotor blade assembly 804 within and outside the housing 802 for stowing (shown) and un-stowing (not shown) using a device (not shown) such as the jackscrew. Slightly curved or flat sleeves (shown as dashed) 810 can be positioned within the fuselage and the high-wing that can be capable of translation to cover an opening 812 in the housing 802 to seal the housing interior 814 from air flow before and after stowing and un-stowing of the rotor blade assembly 804.

Figure 9:
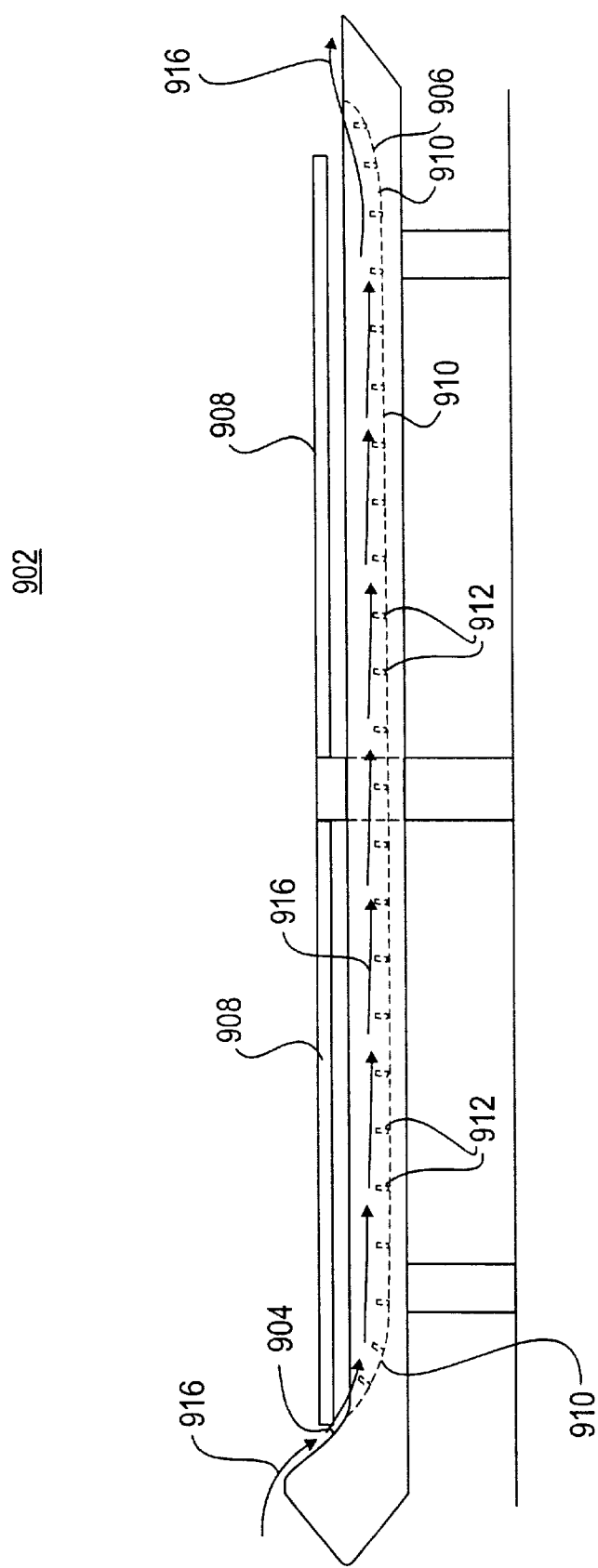
FIG. 9 is an illustration of one embodiment of an external encapsulating housing with an aerodynamically shaped interior surface.

FIG. 9 shows a cross-section of an encapsulating housing that has interior surfaces shaped to reduce turbulence and promote smooth laminar flow of air. The encapsulating housing 902 can be shaped to reduce turbulence and promote laminar flow from air around and through an open housing 902. Airflow 916 can exit the interior of the housing 902 through an opening 914 at the aft end of the housing 902. Shaping, such as a tapered nose surface 904 and tapered end surface 906, can allow the airflow to bend around the housing 902 interior and exterior surfaces to minimize turbulence. Such shaping can be accomplished on interior surfaces of both an external housing 902 as well as an integral housing 802 (see FIG. 8A). Turbulent airflow around the rotor blades 908 could create problems by causing the rotor blades 908 to flex or vibrate in a manner that would make stopped rotor blades 908 difficult to stow. Further, the housing 802 can be aerodynamically shaped to minimize turbulence along the inner surfaces as a result of rotor blade downwash.

The housing 902 can be shaped to make use of the Coanda effect to bend the airflow along the housing interior 910 contours during horizontal flight. The Coanda effect relates to the tendency of a fluid flow when striking an object, to create a boundary layer along the surface with the result that the flow follows the surface of the object. The housing 902 can be shaped to allow for air flowing along the housing interior surfaces 910 to reduce turbulence which can affect the ability to stow the rotor blades 908. In addition, the housing 902 can have small vanes 912 placed in the contoured surfaces 910 exposed to the airflow. The vanes 912 can be positioned perpendicular to the curved surface 910. Angled into the airflow, the vanes 912 can produce small vortices, which may delay boundary layer separation and further reduce turbulence and may also reduce drag.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus, comprising:
  a first rotor blade assembly capable of generating vertical lift;
  one or more propulsion units capable of engaging and disengaging from the rotor blade assembly; and
  an external encapsulating housing mounted on a fuselage, wherein the external encapsulating housing is capable of containing the first rotor blade assembly.

2. The apparatus of claim 1, further comprising an interior surface of the external encapsulating housing that is aerodynamically shaped.

3. The apparatus of claim 2, wherein a plurality of vanes are disposed approximately perpendicular on the interior surface.

4. The apparatus of claim 1, wherein the first rotor blade assembly is capable of translating into and outside the external encapsulating housing.

5. The apparatus of claim 1, further comprising at least one fixed-wing capable of providing aircraft lift.

6. The apparatus of claim 5, further comprising a canard wing capable of providing aircraft lift.

7. The apparatus of claim 1, wherein the external encapsulating housing is translatable relative to the fuselage to stow and un-stow the first rotor blade assembly.

8. The apparatus of claim 7, wherein the translation is accomplished with an electromechanical system.

9. The apparatus of claim 7, wherein the translation is accomplished with a fluid system.

10. The apparatus of claim 7, further comprising a first lid capable of sealing or opening the external encapsulating housing.

11. The apparatus of claim 10, wherein the first lid is a semi-cylindrical shape capable of rotation.

12. The apparatus of claim 11, wherein the first lid has a slot for rotor shaft clearance.

13. The apparatus of claim 12, further comprising a sleeve capable of translation to seal or open the slot.

14. The apparatus of claim 10, further comprising a second lid operating as a clamshell with the first lid.

15. The apparatus of claim 1, further comprising:
  an attitude reaction control system.

16. An apparatus, comprising:
  an airframe;
  at least one rotor blade assembly; and
  means for stowing the at least one rotor blade assembly within an external encapsulating housing attached to a fuselage of the airframe.

17. A method, comprising:
  providing vertical lift to an airframe with a first rotor blade assembly;
  becoming airborne with the vertical lift;
  transitioning to horizontal flight with a thrust from at least one jet engine;
  generating lift by at least one fixed-wing attached to the airframe;
  braking the first rotor blade assembly; and
  stowing the first rotor blade assembly within an external encapsulating housing.

18. The method of claim 17, wherein providing lift includes providing rotation power to the first rotor blade assembly with an engine.

19. The method of claim 18, wherein the power is generated by a direct drive link to the first rotor blade assembly.

20. The method of claim 18, wherein the power is generated by a flow of air directed from the engine to tips of the first rotor blade assembly.

21. The method of claim 17, wherein stowing includes translating the external encapsulating housing toward the first rotor blade assembly.

22. The method of claim 17, wherein stowing includes translating the first rotor blade assembly toward the encapsulating housing.

23. The method of claim 17, further comprising:
un-stowing the first rotor blade assembly; and
transitioning to substantially vertical flight with the first rotor blade assembly.

24. The method of claim 17, further comprising substantially hovering.

25. The method of claim 17, further comprising landing from the vertical flight.

26. The method of claim 21, wherein stowing further includes rotating a semi-cylindrical shaped lid over an opening in the external encapsulating housing.

27. The method of claim 26, wherein the rotation of the semi-cylindrical shaped lid is approximately 180 degrees.

28. The method of claim 23, further comprising providing vertical lift with a second rotor blade assembly that has a phase angle relative to the first rotor blade assembly.

29. An apparatus, comprising:
an airframe including a fuselage and one or more wings;
a first rotor blade assembly capable of generating vertical lift;
one or more propulsion units capable of engaging and disengaging from the rotor blade assembly; and
an encapsulating housing integral to the airframe, wherein the integral encapsulating housing is disposed within the fuselage and at least one wing; and the integral encapsulating housing is capable of containing the first rotor blade assembly.

30. The apparatus of claim 29, further comprising an interior surface of the integral encapsulating housing that is aerodynamically shaped.

31. The apparatus of claim 30, wherein a plurality of vanes are disposed approximately perpendicular on the interior surface.

32. The apparatus of claim 29, wherein the first rotor blade assembly is capable of translating into and outside the integral encapsulating housing.

33. The apparatus of claim 32, further comprising:
a second rotor blade assembly stacked with the first rotor blade assembly and capable of generating vertical lift;
the one or more propulsion units capable of engaging and disengaging from the second rotor blade assembly, wherein the second rotor blade assembly is capable of translating into and outside the integral encapsulating housing.

34. A method, comprising:
providing vertical lift to an airframe with a first rotor blade assembly;
becoming airborne with the vertical lift;
transitioning to horizontal flight with a thrust from at least one jet engine;
generating lift by at least one fixed-wing attached to the airframe;
braking the first rotor blade assembly; and
stowing the first rotor blade assembly within an integral encapsulating housing disposed within a fuselage and at least one wing of the airframe.

35. The method of claim 34, wherein providing lift includes providing rotation power to the first rotor blade assembly with an engine.

36. The method of claim 35, wherein the power is generated by a direct drive link to the first rotor blade assembly.

37. The method of claim 35, wherein the power is generated by a flow of air directed from the engine to tips of the first rotor blade assembly.

38. The method of claim 34, wherein stowing includes translating the first rotor blade toward the integral encapsulating housing.

39. The method of claim 34, further comprising:
un-stowing the first rotor blade assembly; and
transitioning to substantially vertical flight with the first rotor blade assembly.

40. The method of claim 38, further comprising substantially hovering.

41. The method of claim 38, further comprising landing from the vertical flight.

42. The method of claim 34, wherein stowing further includes translating one or more panels with panel mechanisms to open or close the integral encapsulating housing.

43. The method of claim 38, further comprising stowing, un-stowing, and providing vertical lift with a second rotor blade assembly that has a phase angle relative to the first rotor blade assembly.

44. The method of claim 43, wherein stowing includes translating the second rotor blade assembly toward the integral encapsulating housing.

45. The apparatus of claim 1, further comprising:
more than one rotor blade assembly capable of generating vertical lift,
wherein the external encapsulating housing is capable of containing the more than one rotor blade assemblies.

46. The apparatus of claim 1, wherein the one or more propulsion units are jet engines capable vectoring one or more jet engine exhaust nozzles to provide vertical lift with a downward thrust of jet engine exhaust.

* * * * *